Sept. 25, 1928.                                                    1,685,417
L. C. COLE
CAR WHEEL BORING AND FACING MACHINE
Filed May 10, 1927          2 Sheets-Sheet 2

INVENTOR.
L. C. Cole
BY
Joseph K. Schofield
ATTORNEY

Patented Sept. 25, 1928.

1,685,417

UNITED STATES PATENT OFFICE.

LYNDON C. COLE, OF HAMILTON, OHIO, ASSIGNOR TO NILES-BEMENT-POND COMPANY, OF NEW YORK, N. Y., A CORPORATION OF NEW JERSEY.

CAR-WHEEL BORING AND FACING MACHINE.

Application filed May 10, 1927. Serial No. 190,278.

This invention relates to boring and facing machines and particularly to a machine designed primarily for boring and facing the hubs of car wheels.

An object of the present invention is to provide an improved form of boring and facing machine adatped to permit simultaneous boring and facing operations upon a work blank such as a car wheel.

Another object of the present invention is to provide a boring and facing machine in which the work is clamped in position in a slidably mounted head so that it is held against rotation, and the boring and facing tools are simultaneously rotated about a common axis.

Another object of the invention is to provide a mounting for a boring bar and facing tool in which the facing tool is mounted on and movable axially relative to the boring bar.

A still further object of the invention is to provide fluid means to advance the facing tool along the boring bar during operation of the machine so that the face of the wheel hub may be finished during the boring operation.

Another object of the invention is to provide an improved duplex machine permitting simultaneous operation upon two car wheels or other work blanks.

With these and other objects in view, my invention consists in the features of construction and operation set forth in the following specification and illustrated in the accompanying drawings.

In the accompanying drawings annexed hereto and forming a part of this specification, I have shown my invention embodied in a car wheel boring and facing machine, but it will be understood that the invention can be otherwise embodied and that the drawings are not to be construed as defining or limiting the scope of the invention, the claims appended to this specification being relied upon for that purpose.

Figure 1:
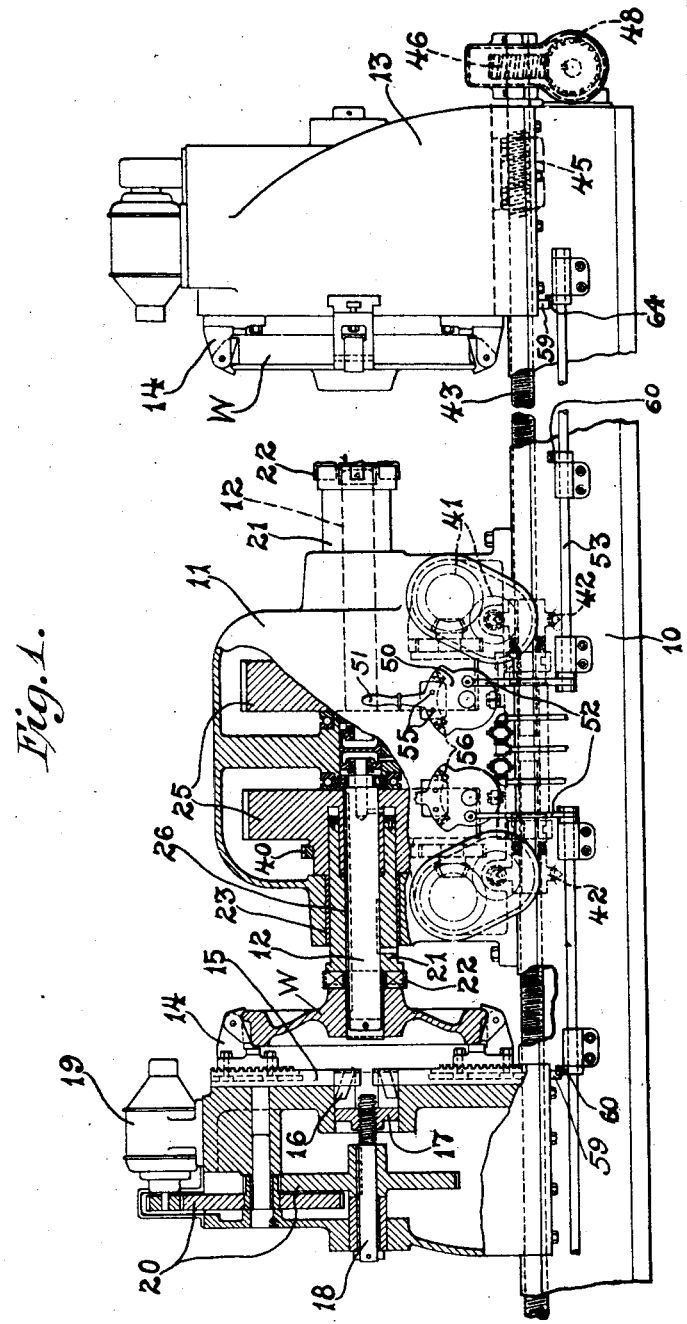
Figure 1 is a front elevation of a complete boring and facing machine made according to the present invention, parts being shown in section to more clearly disclose their construction.
Figure 2:
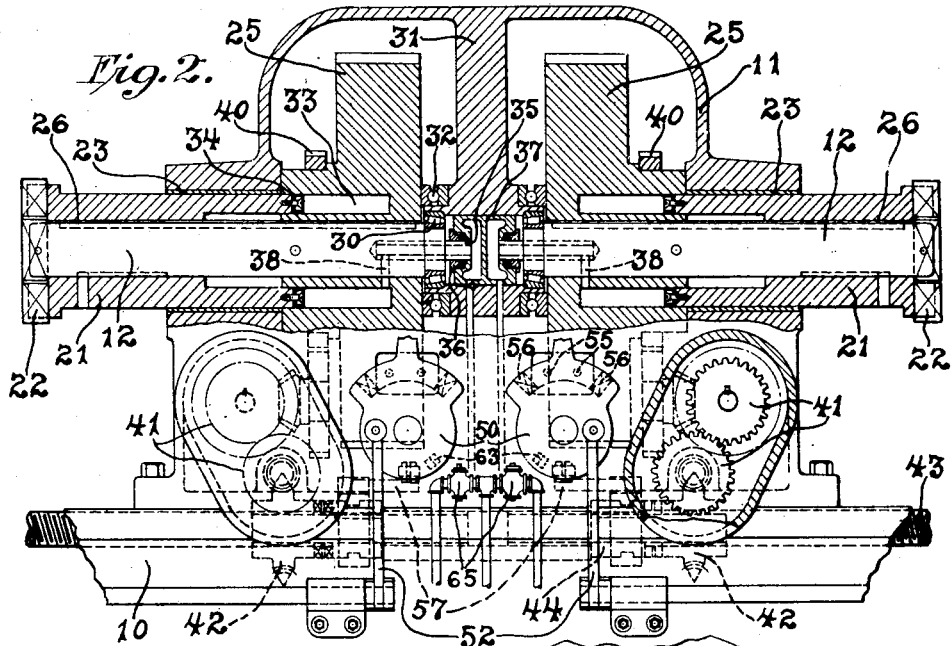
Fig. 2 is an enlarged front elevation, partly in section, of the tool supporting head and parts mounted thereon.
Figure 3:
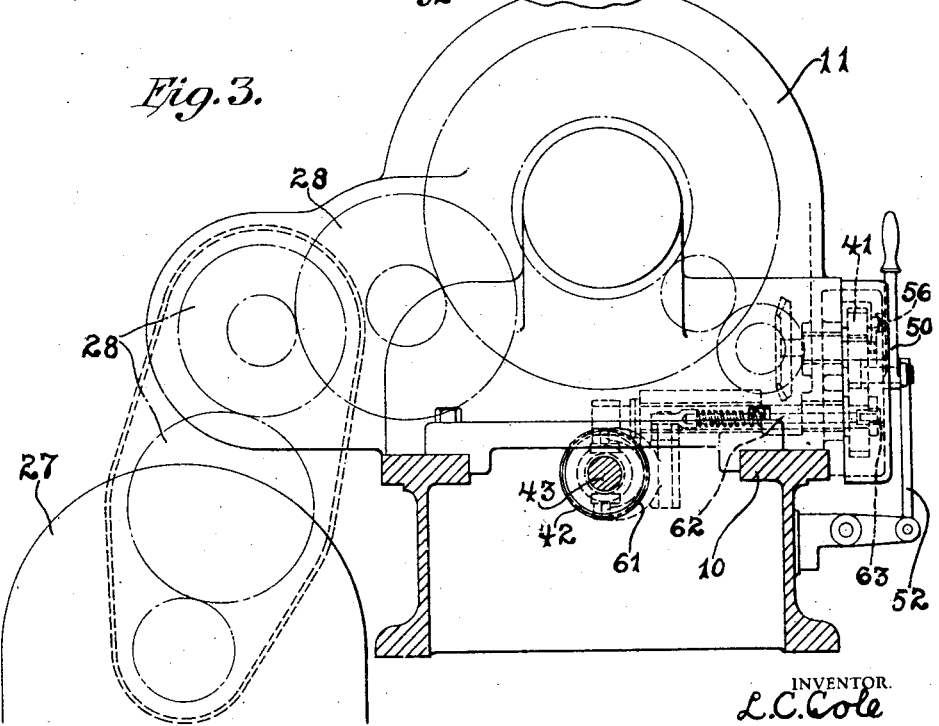
Fig. 3 is a side elevation of the tool supporting head shown in Fig. 2.

In the above mentioned drawings I have shown but one embodiment of the invention which is now deemed preferable, but it is to be understood that changes and modifications may be made within the scope of the appended claims without departing from the spirit of the invention.

Briefly, and in its broadest aspect, my invention comprises the following principal parts: First, a base; second, a centrally disposed tool supporting head adapted to be secured rigidly in position on the base; third, work supporting heads mounted on opposite sides of the tool supporting head and slidable toward and from the central tool supporting head; fourth, boring bars mounted in the tool supporting head and projecting from opposite sides; fifth, facing tools mounted on and rotated with the boring bars; sixth, rotating means for said boring and facing tools; seventh, fluid means to force the facing tool axially relative to the boring bar while the boring bar and facing tool are rotating; and eighth, means to move the work supporting heads toward and from the tool supporting head.

Referring more in detail to the figures of the drawings, I provide a base 10 on which is mounted a tool supporting head 11 substantially midway of the length of the base 10. This tool supporting head 11, as shown, is provided with two oppositely mounted boring bars 12 extending horizontally and parallelly relative to the base 10. The mechanism mounted on this tool supporting head 11 will presently be described.

Slidably mounted on the base 10 on opposite sides of the tool supporting head 11 are work supporting heads 13 having clamping means 14 for the work such as a car wheel W. As these work supporting heads 13 are similar to each other, but oppositely disposed on the base 10, a description of one will be sufficient. This work supporting head 13 is shown in section at the left-hand end of Fig. 1 and comprises work engaging clamps 14 adapted to be adjustably secured to radially movable arms 15. These arms 15 are slidable in recesses angularly disposed in the face of the work supporting head 13. At their inner ends the arms are provided with recesses adapted to engage projections 16 formed in a member 17 centrally mounted in the work supporting head 13 and movable axially. As the projections 16 in this central member 17 are oblique, axial movement of this centrally disposed member 17 moves the radially disposed arms 15 toward and from the center of the work supporting head 13 so that the clamps 14 engaging the work wheel W are simultaneously movable. The wheel or other work blank W is therefore fixed against rotation upon a horizontal axis when the central member 17 is forced as far as possible in one direction.

In order to effect axial movement of the centrally disposed member 17, a screw 18 is provided engaging a nut formed in the centrally disposed member 17 so that rotation of this screw 18 will force the centrally disposed member 17 in either direction. In order to rotate this screw 18 in opposite directions, a motor 19 is provided, preferably mounted directly on the upper surface of the work supporting head 13 and connected by suitable gearing 20 to the screw 18. By rotating the motor 19 in opposite directions the work W may be readily clamped or unclamped. When clamped the work W is held rigidly to the head 13 upon a horizontal axis in alignment with the axis of rotation of the boring bar 12.

Within the tool supporting head 11 is provided a boring bar 12 for each of the work supporting heads 13, these bars extending horizontally from opposite sides of the head 11. As these boring bars and their attached parts are similar to each other, a description of one will suffice. The boring bar 12, as shown, is mounted in exact axial alignment with the work blank W being bored. Surrounding each boring bar 12 is a sleeve 21 having a facing tool 22 at its outer end. This facing tool sleeve 21 engages suitable bearings 23 provided in the tool supporting head 11 and is slidably mounted relative to and upon the boring bar 12. This facing tool sleeve 21 is splined to the boring bar 12 so that rotation of the boring bar 12 will simultaneously rotate the facing tool sleeve 21 and its tool 22.

In order to simultaneously rotate the boring bar 12 and the facing tool sleeve 21, a large driving gear 25 is provided splined directly to the inner end of each of the boring bar 12, preferably as shown by the key 26 for driving the facing tool sleeve 21. Means to rotate this gear 25 comprise a motor 27 mounted in the rear of the base 10 and connected by suitable gearing 28 to rotate the boring bar 12 and facing tool sleeve 21 at a relatively slow speed.

As above stated the facing tool sleeve 21 is supported within a bearing 23 in the tool supporting head 11. The bar 12 is supported within this sleeve 21 so that the sleeve 21 may slide thereon. At the inner end of the boring bar 12 is provided a roller bearing 30 adapted to take the end thrust of the bar 12 against a central integral web 31 of the tool supporting head 11. Also to take up the end thrust of the driving gear 25 when the facing tool 22 is in operation a thrust bearing of the ball type 32 is inserted between the face of the driving gear 25 and the central web 31 of the head 11.

The facing tool sleeve 21 is slidable coaxially upon the boring bar 12 and is adapted to be moved by fluid means. For this purpose an annular recess 33 is provided in the driving gear 25 for the boring bar 12 and facing tool sleeve 21. Into this recess 33 extends the inner recessed end of the facing tool sleeve 21 which may be provided with a cupped washer 34 on its inner face. To the chamber formed by this recess 33 and at the inner end thereof is adapted to be admitted fluid under high pressure so that during the rotation of the boring bar 12 the facing tool 22 with its sleeve 21 rotating simultaneously with the bar 12 may be forced forwardly with sufficient pressure to cut the hub face of the car wheel W. In order to admit water or other fluid to this chamber 33 a pipe or tube 35 is inserted in the inner end of the boring bar 12, the outer end of which passes through a gland 36 into a centrally disposed hollow member 37 to which fluid pressure may be admitted or exhausted to independent openings, one for each of the bars 12. Adjacent the opposite end of the pipe or tube 35 entering the boring bar 12 a lateral opening 38 is provided extending through the facing tool sleeve directly to the chamber 33 within the driving gear 25. It will be seen, therefore, from the above description, that by admitting fluid pressure to one of the openings within the centrally disposed hollow member 37 the facing tool 22 may be fed forwardly under high pressure to perform its cutting operation.

In order to feed the work W in either work head 13 toward and from the tool supporting head 11 during operation, a driving gear 40 is mounted on the bar rotating gear 25 drivingly connected through suitable intermediate gears 41 to a member 42 of a clutch forming a worm gear rotatably mounted on an elongated screw 43. Adjacent the worm gear 42 on the screw 43 is a cooperating clutch member 44 splined to the screw 43 so that when the clutch members 42 and 44 are in engagement the screw 43 will be rotated slowly thus forcing the work supporting head 13 toward the tool supporting head 11 during the boring operation. It will be understood that similar but oppositely disposed constructions as above described are employed for rotating the screw 43 for the opposite work head 13. In each of the heads 13 are fixed nuts 45 directly engaging the screw 43. In order to traverse the work supporting head 13 up to and away from the boring and facing tools 12 and 22 on the tool supporting head 11, means is provided to rapidly rotate the screw 43, preferably by means of a helical gear 46 fastened at the outer end of this screw 43. This gear 46 may be rotated by a small motor (not shown) connected to a second helical gear 48. As shown in Fig. 1 a screw 43 is provided for each of the heads 11.

In order to facilitate controlling the machine, an oscillating lever member 50 is provided for each side of the machine having a hand lever 51 at its upper end and provided with a reach arm 52 extending to an oscillating shaft 53 disposed in front of and extending parallelly along the base 10. Oscillation of the member 50, therefore, oscillates the shaft 53 and vice versa. Movement of the handle to extreme positions depresses one or the other of a pair of push buttons 55 by engagement with cam surfaces 56 on member 50 controlling the rotation of the work head advancing motor so that the work head may be rapidly advanced or retracted. Just before the work blank W reaches the boring tool 12 or its extreme retracted position, a projection 59 on the head 11 strikes a small lever 60 on the shaft 53 which oscillates the rock shaft 53 in a direction to stop the work head traversing motor. The movable clutch member 44 on the elongated screw 43 is operated by a yoke member 61 connected to a lever 62 actuated by a cam 63 on the lower inner face of the lever 50 so that when the lever 50 is oscillated to intermediate positions the clutch 44 is engaged to feed the head 11 slowly forward.

At the completion of the feeding movement of the work head 11 the lever 50 is oscillated in the reverse direction, which disengages the clutch 44 and stops the feeding movement of the head 11. Oscillating the lever to the opposite extreme position depresses a push button 55 to rotate the screw 43 rapidly in the opposite direction to return the work head to its initial position. A cam lever 64 on shaft 53 is engaged by the depending lug 59 on the head 13 to oscillate the shaft 53 and stop further rotation of the screw 43.

To control the movements of the sleeve 21 to effect facing of the hub of the work W during the boring operation, manually operated valves 65 are provided. These may be of the three way type to admit and exhaust fluid to the chambers within the member 37.

What I claim is:

1. A boring and facing machine comprising in combination, a work supporting head having work holding means thereon, a tool supporting head having a boring bar therein, a facing tool mounted coaxially with said boring bar in said tool supporting head, fluid means to force said facing tool axially relative to said boring bar, means admitting fluid through said bar to advance said facing tool, and means for simultaneously rotating said bar and facing tool.

2. A boring and facing machine comprising in combination, a work supporting head having work holding means thereon, a tool supporting head having a boring bar therein, means to rotate said bar, a facing tool mounted coaxially with said boring bar in said tool supporting head, means to move said facing tool relative to said boring bar, means to rotate said facing tool with said boring bar, and means to feed said work supporting head toward said tool supporting head.

3. A boring and facing machine comprising in combination, a work supporting head having work holding means thereon, a tool supporting head having a boring bar therein, means to rotate said bar, a facing tool mounted coaxially with said boring bar in said tool supporting head, means to move said facing tool axially relative to said boring bar during rotation of said bar, means to rotate said facing tool from and simultaneously with said boring bar, and means to feed said work supporting head toward said tool supporting head.

4. A boring and facing machine comprising in combination, a work supporting head having work holding means thereon, a tool supporting head having a boring bar therein, means to rotate said bar, a facing tool mounted coaxially with and supporting said boring bar in said tool supporting head, means to move said facing tool axially relative to said boring bar, means to rotate said facing tool with said boring bar, and screw threaded means to feed said work supporting head toward said tool supporting head.

5. A boring and facing machine comprising in combination, oppositely disposed work supporting heads having work holding means thereon, a central tool supporting head having oppositely extending boring bars therein, unitary means to rotate said bars, a facing tool mounted coaxially with each of said boring bars in said tool supporting head, means to move said facing tools axially relative to boring bar on which they are mounted, means to rotate said facing tools with said boring bars, and means to independently feed said work supporting heads toward said tool supporting head.

6. A boring and facing machine comprising in combination, a work supporting head having work holding means thereon, a tool supporting head having a boring bar therein, a facing tool mounted coaxially with said boring bar in said tool supporting head, means to simultaneously rotate said boring bar and facing tool, means to slowly feed said work supporting head toward said tool supporting head, and means to rapidly traverse said work supporting head toward and away from said tool supporting head.

7. A boring and facing machine comprising in combination, a work supporting head having work holding means thereon, a tool supporting head having a boring bar therein, a facing tool mounted coaxially with said boring bar in said tool supporting head, means to simultaneously rotate said boring bar and facing tool, means driven from said rotating means to feed said work supporting head toward said tool supporting head, and means to rapidly traverse said work supporting head toward and away from said tool supporting head.

8. A boring and facing machine comprising in combination, a work supporting head having work holding means thereon, a tool supporting head having a boring bar therein, a facing tool mounted coaxially with and movable axially relative to said boring bar in said tool supporting head, means to simultaneously rotate said boring bar and facing tool, means to feed said work supporting head toward said tool supporting head, and means to rapidly traverse said work supporting head away from said tool supporting head.

9. A boring and facing machine comprising in combination, a work supporting head having work holding means thereon, a tool supporting head having a boring bar therein, a facing tool mounted coaxially with said boring bar in said tool supporting head, means to simultaneously rotate said boring bar and facing tool, means driven from said rotating means to feed said work supporting head toward said tool supporting head, and independently driven means to rapidly traverse said work supporting head toward and away from said tool supporting head.

In testimony whereof, I hereto affix my signature.

LYNDON C. COLE.